(12) United States Patent
Hines

(10) Patent No.: US 8,580,123 B2
(45) Date of Patent: Nov. 12, 2013

(54) SKIMMER, BARGE AND METHODS FOR RECOVERING AND TRANSFERRING HEAVY OIL OR BITUMEN

(75) Inventor: David Hines, Wimborne (CA)

(73) Assignee: Environment Recovery Equipment, Wimborne (CA)

(*) Notice: Subject to any disclaimer, the term of this patent is extended or adjusted under 35 U.S.C. 154(b) by 235 days.

(21) Appl. No.: 12/929,824

(22) Filed: Feb. 17, 2011

(65) Prior Publication Data

US 2012/0211435 A1  Aug. 23, 2012

(30) Foreign Application Priority Data

Feb. 16, 2011  (CA) ..................... 2731868

(51) Int. Cl.
*E02B 15/10*   (2006.01)
*E02B 15/04*   (2006.01)
*C02F 101/32*  (2006.01)
*C02F 103/00*  (2006.01)

(52) U.S. Cl.
CPC ............. *E02B 15/046* (2013.01); *E02B 15/048* (2013.01); *E02B 15/104* (2013.01); *C02F 2201/008* (2013.01); *C02F 2209/42* (2013.01); *C02F 2101/32* (2013.01); *C02F 2103/007* (2013.01); *Y10S 210/923* (2013.01)
USPC ........ 210/744; 210/776; 210/104; 210/242.3; 210/923

(58) Field of Classification Search
USPC ................. 210/744, 747.6, 776, 104, 170.05, 210/170.09, 170.11, 242.3, 526, 923
See application file for complete search history.

(56) References Cited

U.S. PATENT DOCUMENTS

| | | | | |
|---|---|---|---|---|
| 1,769,655 | A * | 7/1930 | Stehling | 210/526 |
| 2,291,733 | A * | 8/1942 | Lemmen | 210/526 |
| 3,643,804 | A * | 2/1972 | Sharpton | 210/923 |
| 4,257,889 | A * | 3/1981 | Wober et al. | 210/104 |
| 4,261,827 | A * | 4/1981 | Bronnec | 210/242.3 |
| 4,456,536 | A * | 6/1984 | Lorenz et al. | 210/776 |
| 4,797,205 | A * | 1/1989 | Kitamura | 210/242.3 |
| 4,867,872 | A * | 9/1989 | Russell et al. | 210/104 |
| 5,089,121 | A | 2/1992 | McWhinnie | |
| 5,149,443 | A * | 9/1992 | Varnam | 210/747.6 |
| 5,362,391 | A * | 11/1994 | Stephens | 210/242.3 |
| 5,399,054 | A | 3/1995 | Hines | |
| 5,681,458 | A * | 10/1997 | Favret | 210/776 |
| 5,743,694 | A | 4/1998 | Hines | |
| 6,328,888 | B1 | 12/2001 | Hines | |
| 8,273,250 | B2 * | 9/2012 | Hines | 210/744 |

FOREIGN PATENT DOCUMENTS

FR       2804140       7/2001

* cited by examiner

*Primary Examiner* — Christopher Upton
(74) *Attorney, Agent, or Firm* — Jean C. Edwards; Edwards Neils PLLC

(57) ABSTRACT

Skimmers, barges and related methods recover heavy oil or bitumen from contaminated water environments such as tailings ponds. The skimmer has an articulated mesh-like conveyor driven around a drum by a drive sprocket. A pusher mechanism discharges bitumen or heavy oil from cavities in the conveyor. In one embodiment, the skimmer includes an automatic depth control system. In other embodiments, knife-edged shear plates remove heavy oil or bitumen adhering to the conveyor and drum. A barge may incorporate multiple parallel skimmers. The barge may include a bitumen-transfer pump having an annular fluid-injection flange that generates an annulus of lubricating fluid inside a discharge hose. A method of skimming heavy oil or bitumen involves using a skimmer that automatically adjusts its elevation or depth based on a control signal generated by a depth sensor. Another method recovers and transfers bitumen by lubricating the discharge hose using the annular fluid-injection flange.

23 Claims, 5 Drawing Sheets

SKIMMER, BARGE AND METHODS FOR RECOVERING AND TRANSFERRING HEAVY OIL OR BITUMEN

CROSS-REFERENCE TO RELATED APPLICATIONS

The present application claims the benefit of priority from Canadian Patent Application No. 2,731,868, filed Feb. 16, 2011, the contents of which are herein incorporated by reference in their entirety.

TECHNICAL FIELD

The present invention relates generally to skimmers for removing oil contaminants from a water environment and, in particular, to skimming heavy oil or bitumen from a water environment such as a tailings ponds.

BACKGROUND

Bituminous sands (also known as oil sands or tar sands are sands that contain sand, clay, water, and a dense and very viscous petroleum known as bitumen. Oil sands are developed through two methods: open-pit mining and deep underground production. In open-pit mining, hot water is employed for separating bitumen from the sand. This water is then sent to a tailings pond. The tailings ponds are an environmental concern. For example, these ponds have been harmful to migrating birds. Efforts are continually being made to recover the heavy oil and bitumen from these tailings ponds and to clean and rehabilitate contaminated bodies of water.

Applicant developed and patented some early skimmer technologies that used a continuous conveyor to skim heavy oil or bitumen.

The first is disclosed in U.S. Pat. No. 5,743,694 (Hines) entitled "Oil Recovery Apparatus". This patent disclosed an open-mesh conveyor designed to slope from a vessel into the contaminated water and to run with the lower flight of the conveyor travelling inboard over a flat bottomed trough.

An improvement on the technology disclosed in U.S. Pat. No. 5,743,694 is disclosed in U.S. Pat. No. 6,328,888 (Hines) entitled "Skimmer". The latter patent disclosed a conveyor which utilizes a press roller or other mechanical pusher elements to push the extremely viscous heavy oil or bitumen from the cavities defined by the mesh of the conveyor into a holding tank.

Despite this improvement, very substantial technical challenges remain. Recovering the extremely viscous and sticky bitumen or heavy oil from a contaminated water environment such as a tailings pond is very challenging for a number of reasons. For example, the bitumen or heavy oil adheres to the skimmer mechanism, interfering with the smooth operation of the conveyor and inhibiting discharge from the conveyor. Effective skimming is also highly sensitive to the precise placement and orientation of the skimmer relative to the heavy oil or bitumen floating on the surface of the contaminated water environment. Another problem arises when attempting to transfer bitumen to shore from the holding tank on the barge. Therefore, there exists a need in the oil industry for a more effective skimmer and barge and for more effective methods of skimming bitumen and heavy oil.

SUMMARY

The present invention, in general, provides novel skimmers for skimming heavy oil or bitumen as well as novel barges for recovering and transferring heavy oil or bitumen from the barge to shore or to another vessel. The present invention also provides related methods for recovering and transferring heavy oil or bitumen from a contaminated water environment.

In accordance with one main aspect of the present invention, a skimmer includes a frame for supporting a drive sprocket and for supporting a drum. The skimmer includes a conveyor driven around the drum by the drive sprocket, the conveyor defining a downwardly moving upper flight and an upwardly moving lower flight. A skimmer also includes a trough disposed below a portion of the lower flight, the trough extending from the drum to a discharge opening. The skimmer further includes a pusher mechanism disposed at the discharge opening to force bitumen or heavy oil from the conveyor into the discharge opening. The skimmer further includes a shear plate disposed at the discharge opening, wherein the shear plate has a knife-edge for cutting away bitumen or heavy oil adhering to the conveyor.

In accordance with another main aspect of the present invention, a skimmer includes a frame for supporting a drive sprocket and for supporting a drum. The skimmer includes a conveyor driven around the drum by the drive sprocket, the conveyor defining a downwardly moving upper flight and an upwardly moving lower flight. The skimmer also includes a trough disposed below a portion of the lower flight, the trough extending from the drum to a discharge opening. The skimmer further includes a pusher mechanism disposed at the discharge opening to force bitumen or heavy oil from the conveyor into the discharge opening. The skimmer further includes a shear plate disposed at the drum, wherein the shear plate has a knife-edge for cutting away bitumen or heavy oil adhering to the drum.

In accordance with another main aspect of the present invention, a skimmer includes a frame for supporting a drive sprocket and for supporting a drum. The skimmer includes a conveyor driven around the drum by the drive sprocket, the conveyor defining a downwardly moving upper flight and an upwardly moving lower flight. The skimmer also includes a trough disposed below a portion of the lower flight, the trough extending from the drum to a discharge opening. The skimmer further includes a pusher mechanism disposed at the discharge opening to force bitumen or heavy oil from the conveyor into the discharge opening. The skimmer further includes a shear plate disposed at the drum, wherein the shear plate has a knife-edge for cutting away bitumen or heavy oil adhering to the drum.

In accordance with yet another main aspect of the present invention, a barge for recovering heavy oil or bitumen includes a floating structure adapted to float on a surface of a contaminated water environment and a plurality of parallel skimmers mounted to the floating structure.

In accordance with yet another main aspect of the present invention, a barge for the recovery and transfer of bitumen includes a floating structure adapted to float on a surface of a contaminated water environment, at least one skimmer mounted to the floating structure for recovering bitumen from the surface of the contaminated water environment and for discharging the bitumen into a holding tank, and a bitumen-transfer pump disposed in the holding tank for transferring the bitumen through a discharge hose, wherein the bitumen-transfer pump includes an annular fluid-injection flange for generating an annular barrier of fluid inside the discharge hose to lubricate the inside of the discharge hose.

In accordance with yet a further main aspect of the present invention, a method of skimming heavy oil or bitumen entails disposing a skimmer having a conveyor in a water environment contaminated with heavy oil or bitumen, operating the conveyor of the skimmer to recover the heavy oil or bitumen from the water environment, and automatically controlling a depth of the skimmer using an automatic depth control system that receives a control signal from a depth sensor connected to the skimmer.

In accordance with yet a further main aspect of the present invention, a method of recovering bitumen from a contaminated water environment. The method entails skimming the bitumen from a surface of the contaminated water environment, wherein skimming includes discharging skimmed bitumen into a holding tank, and pumping the bitumen from the holding tank using a transfer pump connected to a discharge hose. The transfer pump may include an annular fluid-injection flange for generating a lubricating annulus of fluid to facilitate transfer of the bitumen through the discharge hose.

BRIEF DESCRIPTION OF THE DRAWINGS

Further features and advantages of the present technology will become apparent from the following detailed description, taken in combination with the appended drawings, in which.

DETAILED DESCRIPTION

In general, and by way of overview, the present invention provides novel skimmers, heavy oil and bitumen recovery and transfer barges and related methods of skimming and transferring heavy oil and bitumen.

The entire disclosures of U.S. Pat. No. 5,743,694 (Hines) entitled "Oil Recovery Apparatus" and U.S. Pat. No. 6,328,888 (Hines) entitled "Skimmer" are hereby incorporated by reference.

Skimmer

Figure 1:
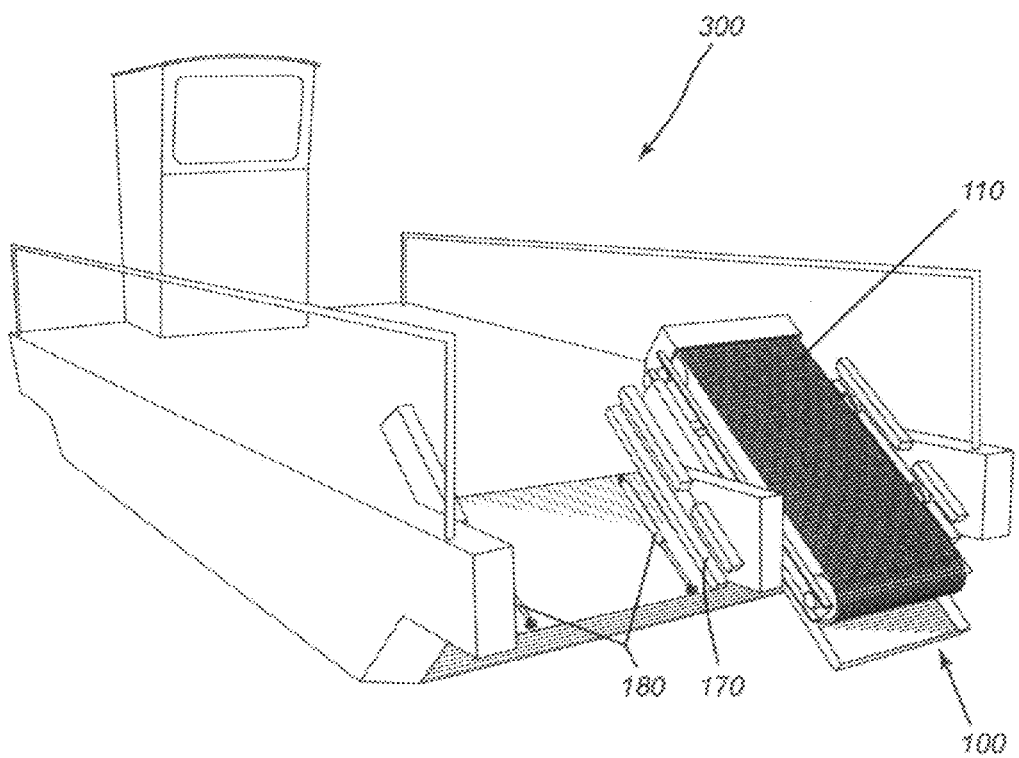
FIG. 1 is a perspective view of a barge and skimmer in accordance with an embodiment of the present invention.

In the embodiments depicted by way of example in the appended figures, the skimmer 100 has a conveyor (or conveyor belt) 110 which is used to skim heavy oil or bitumen and to convey the heavy oil or bitumen into a holding tank. This conveyor may be made of metal such as, for example, stainless steel, although other suitable materials may be utilized. This conveyor may, for example, be mounted to a barge 300 as shown in FIG. 1.

Figure 2:
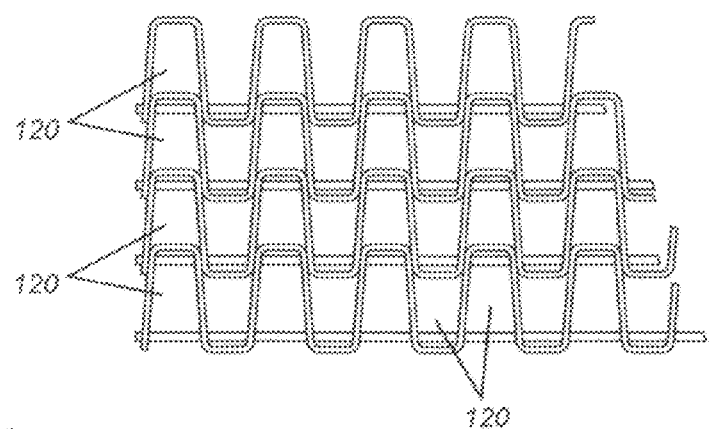
FIG. 2 is a top view of the mesh-like structure of the conveyor used in the skimmer of FIG. 1.

As depicted by way of example in the figures, the conveyor may be an articulated open mesh (as depicted particularly in FIG. 2) defining a plurality of cavities 120 for collecting and transporting the heavy oil or bitumen. An example of a suitable mesh structure for the conveyor is disclosed in U.S. Pat. No. 6,328,888.

In the depicted embodiments, the conveyor may be efficiently driven by a drive sprocket 130 having teeth 132 or cogs that mesh with the cavities of the mesh-like structure of the conveyor. As shown by way of example, the conveyor travels around a drum 140 or roller which is a passive cylindrical or tubular component. The drum may be replaced by any suitable idler, wheel or any suitable combination of passive rolling elements.

Figure 3:
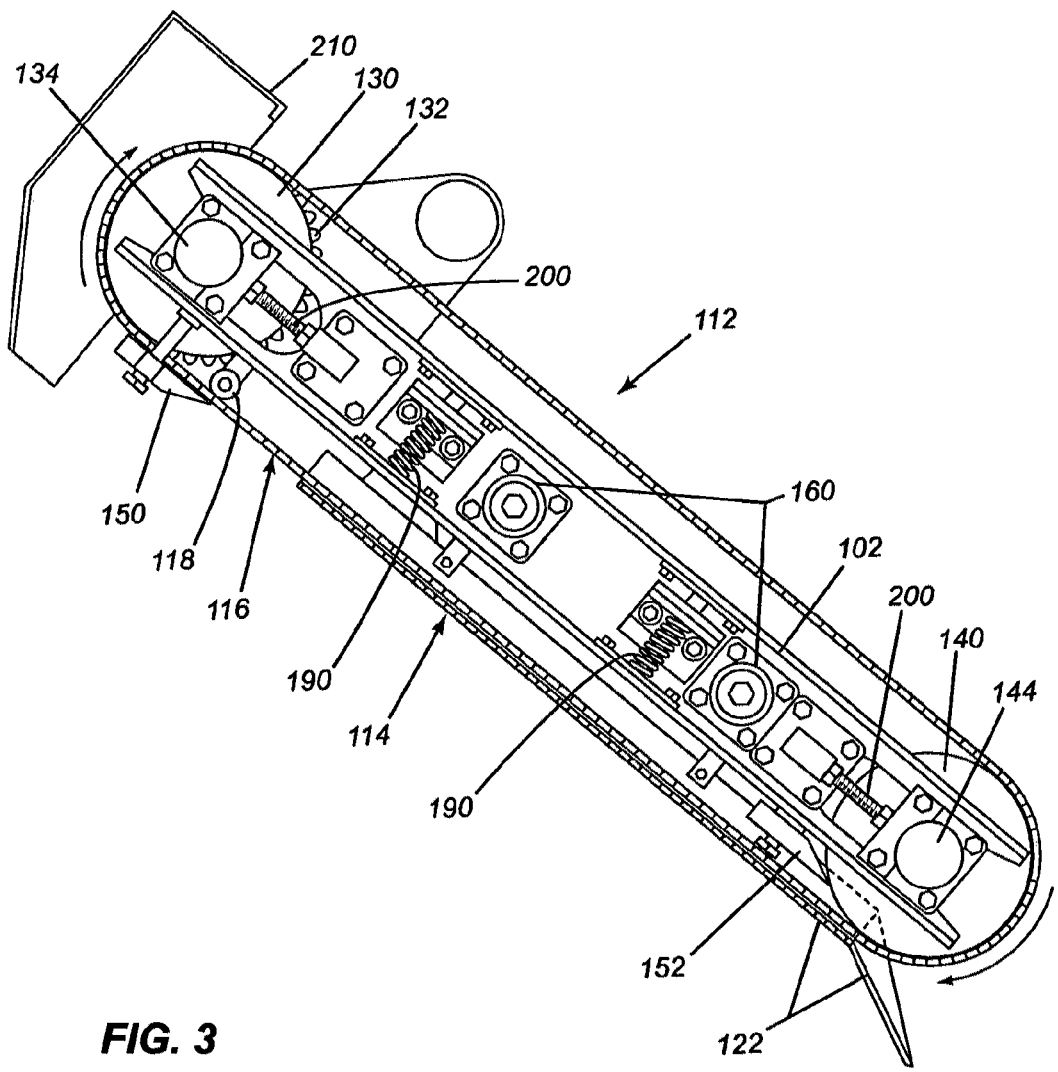
FIG. 3 is a side elevation view of a skimmer in accordance with an embodiment of the present invention.

In the embodiments illustrated, the skimmer 100 has a frame 102 that supports a conveyor 110 that travels in a clockwise direction when viewed from its left side (i.e. when viewed in the manner depicted in FIG. 3). The direction of travel of the conveyor means that an upper flight 112 of the conveyor travels in a downwardly sloping manner from the drive sprocket to the drum whereas a lower flight 114 of the conveyor travels in an upwardly sloping manner from the drum to the drive sprocket. Heavy oil or bitumen is thus collected by the cavities of the mesh-like conveyor as the conveyor dips into the bitumen or heavy oil floating on the surface of the tailings pond or other body of water. The collected bitumen or heavy oil is then conveyed upwardly toward a discharge opening 116 where it discharges into a containment tank or holding tank in the barge.

Because of the extremely high viscosity of the bitumen or heavy oil being conveyed, the bitumen or heavy oil will resist falling naturally (under the effect of gravity) into the containment tank. Therefore, to facilitate the discharge from the conveyor, a pusher mechanism 118 is provided. The pusher mechanism may be a press roller of the type disclosed in U.S. Pat. No. 6,328,888. This press roller has teeth that are adapted by their shape and size to press the heavy oil or bitumen from the cavities. Other non-rotary presses or pushing elements may be utilized.

A trough or tray 122 extends as shown by way of example in the figures from the bottom of the lower flight to a discharge opening where the bitumen or heavy oil discharges into the containment tank. The trough (tray) protects the barge from any bitumen or heavy oil that detaches prematurely from the conveyor while it is being conveyed up to the discharge opening.

Because the bitumen or heavy oil tends to adhere or cling to the conveyor, a shear plate 150 is provided to cut away the bitumen or heavy oil from the conveyor so that the bitumen or heavy oil falls into the containment tank disposed below the discharge opening. This top shear plate may be disposed at a top of the lower flight of the conveyor, adjacent the discharge opening and press roller.

In another main set of embodiments, this top shear plate is a knife-edged (or razor-edged) shear plate designed to cut off bitumen. This knife-edged shear plate is an improvement on the flat-faced shear plate of U.S. Pat. No. 6,328,888 because the knife edge cuts the bitumen off rather than attempting to scrape it off.

The knife-edged shear plate has a razor-sharp blade that may be, for example, bevelled or cut at 45 degrees to present a sharp but robust leading edge. As shown in the embodiments depicted in the figures, the shear plate points downwardly toward the upper end of the trough to thereby define the discharge opening. In other words, the discharge opening is defined by the space between the lower edge of the knife-edged shear plate and the upper edge of the trough.

Not only does the bitumen or heavy oil tend to adhere to the conveyor, but it also may adhere to the drum. Accordingly, to address this further problem, in one main set of embodiments, the novel skimmer has a lower shear plate 152 disposed at a bottom of the lower flight of the conveyor. This lower shear plate may have a knife edge (or razor edge) which may or may not be the same as the knife-edged upper shear plate. The lower shear plate cuts off the bitumen to thereby clean the lower drum so that the lower drum does not reload the belt with bitumen before it has the opportunity to pick up new bitumen from the water surface. In the embodiments illustrated, this lower drum-cleaning shear plate points downwardly and is positioned tangentially to the bottom of drum. Bitumen adhering to the drum is sliced off by the lower shear plate and falls naturally into the cavities of the conveyor beneath.

Applicant has also recognized that maintaining the skimmer at the right elevation or depth optimizes its effectiveness. Accordingly, in another main set of embodiments, the skimmer has an automatic elevation control system for automatic adjustment of the elevation (or "depth") of the skimmer. A sensor provides a control signal to a controller which, in turn, controls the hydraulics automatically to regulate the elevation (depth) of the skimmer.

In one implementation, the sensor may be a float bulb which sends an elevation/depth signal to a controller for controlling the elevation/depth of the skimmer. The controller may be any microprocessor, processing unit, computer, etc. In one implementation, the controller automatically controls a pair of hydraulic cylinders 180 to raise and lower the skimmer. In another implementation, one controller receives control signals from multiple sensors and individually controls multiple parallel skimmers based on their respective control signals.

While the three new features described above (top knife-edged shear plate, bottom drum-cleaning shear plate, and automatic elevation control) may be used independently of one another in different variants of the skimmer, for optimal performance, the skimmer should employ all three of these features, i.e. the skimmer should include the knife-edged top shear plate, the knife-edged bottom shear plate, and the automatic elevation control system. Using all three of these novel features enables the skimmer to operate with utmost efficiency and effectiveness. The elevation/depth control system automatically adjusts the skimmer's depth for optimal pick-up of new bitumen or heavy oil while the shear plates cut away bitumen from the conveyor and drum to keep the conveyor running efficiently.

Further design features of the skimmer will now be described.

The skimmer may also include four wheel assemblies 160 for displacing the frame of the skimmer over guide rails 170, as shown by way of example in FIG. 1. The wheel assemblies and guide rails together form a carriage assembly for smooth motion of the skimmer when raising or lowering the skimmer into the water. One or more stops on each guide rail 170 is provided to ensure that the skimmer cannot roll into the water in the unlikely event that the hydraulic cylinders 180 were to fail mechanically. The rails may be affixed (e.g. welded) to the side of the barge hull.

In one embodiment, the skimmer includes a trough-tensioning mechanism (or "tray-tensioning mechanism") for holding the trough ("tray") at a predetermined distance beneath the lower flight of the conveyor. The trough-tensioning mechanism may include a plurality of spring assemblies 190 in which coil springs are arranged substantially perpendicular to the upper and lower flights of the conveyor. Because of the mechanical elasticity introduced by the spring assemblies 190, the trough 122 can displace over a limited range to provide a gap sufficient for debris or foreign objects (e.g. branches, stones, animal bones, etc.) having a size up to about 1 inch (2.5 cm) to pass between the lower flight of the conveyor and the trough. Without this spring-loaded trough, debris or foreign objects might cause the conveyor to jam.

The frame of the skimmer may also include four bearing-adjustment mechanisms 200 for adjusting the relative positions of the left and right bearings 134 of the drive sprocket 130 and the left and right bearings 144 of the drum 140. These four bearing-adjustment mechanisms 200 enable adjustment of the tension in the conveyor 110 by regulating the distance between the axes of the drive sprocket 130 and drum 140. The bearing-adjustment mechanisms 200 also permit adjustment of the tracking of the conveyor 110 (to ensure that it tracks correctly for optimal performance).

Figure 4:
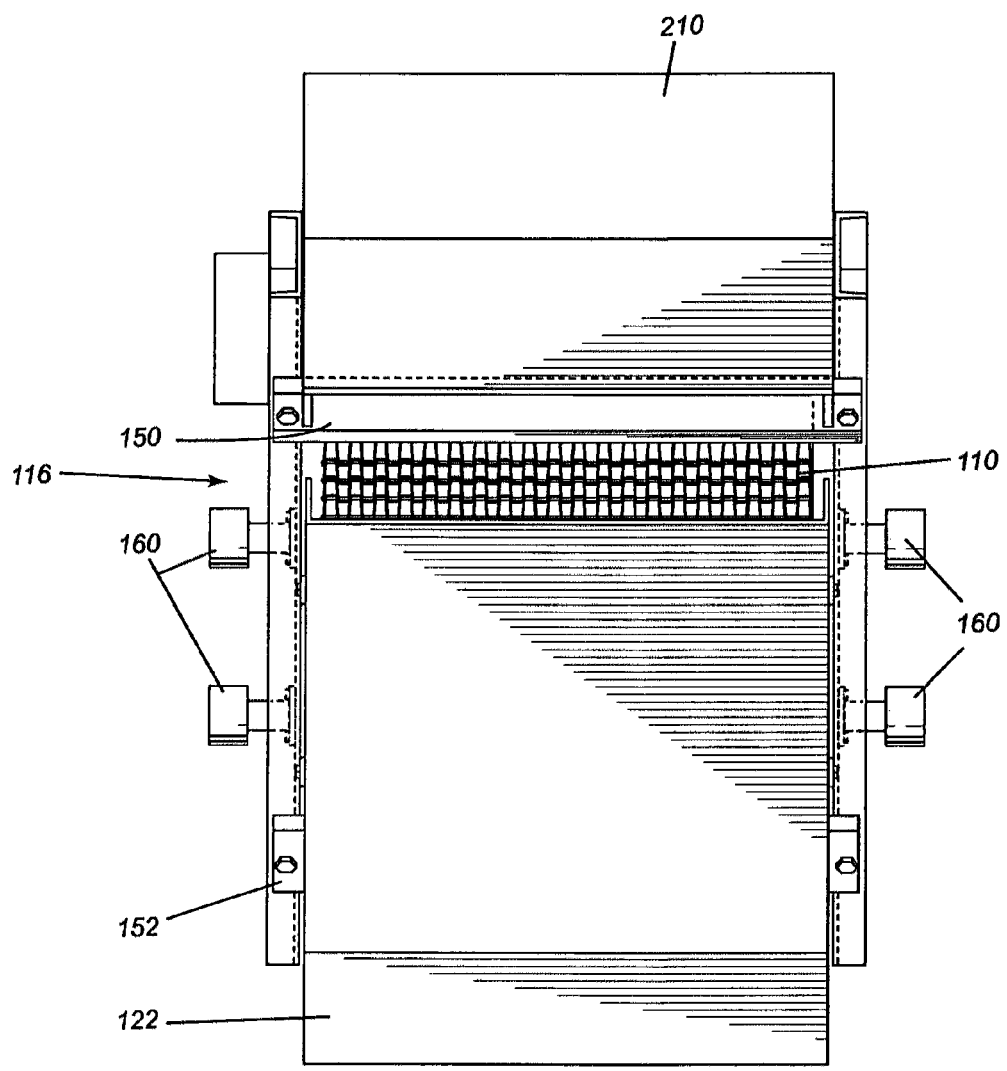
FIG. 4 is a view of the lower flight of the conveyor of the skimmer of FIG. 3.

The skimmer 100 may also include a funnel and splash guard 210 that guides material into the holding tank and prevents spattering of oil. As shown by way of example in FIG. 3 and FIG. 4, this funnel and splash guard 210 may be disposed at the top of the conveyor 110, i.e. at least partially enshrouding the drive sprocket.

Barge

The skimmer disclosed above may be mounted to, installed on, or otherwise incorporated into a barge 300. The term "barge" is meant to encompass any type of vessel that is adapted to be used on a tailings pond or contaminated water environment upon whose surface is floating a highly viscous heavy oil, bitumen or similar substance.

Figure 5:
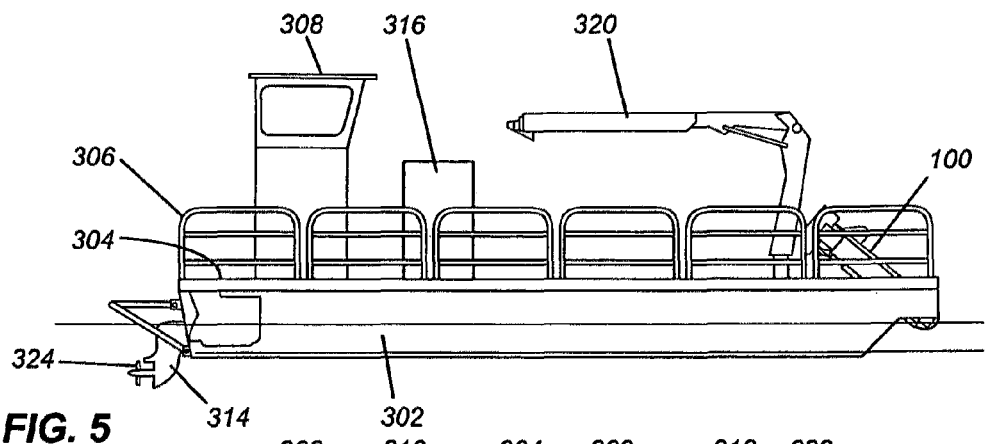
FIG. 5 is a side elevation view of a barge in accordance with an embodiment of the present invention.
Figure 6:
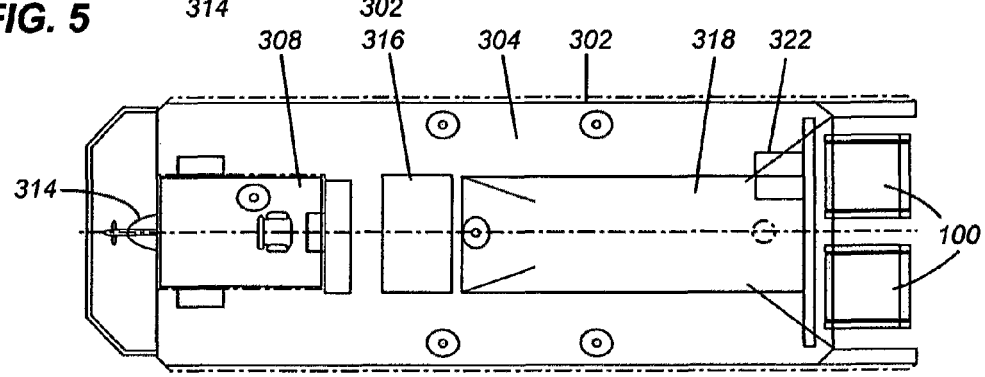
FIG. 6 is a plan of the main deck of the barge of FIG. 5.
Figure 7:
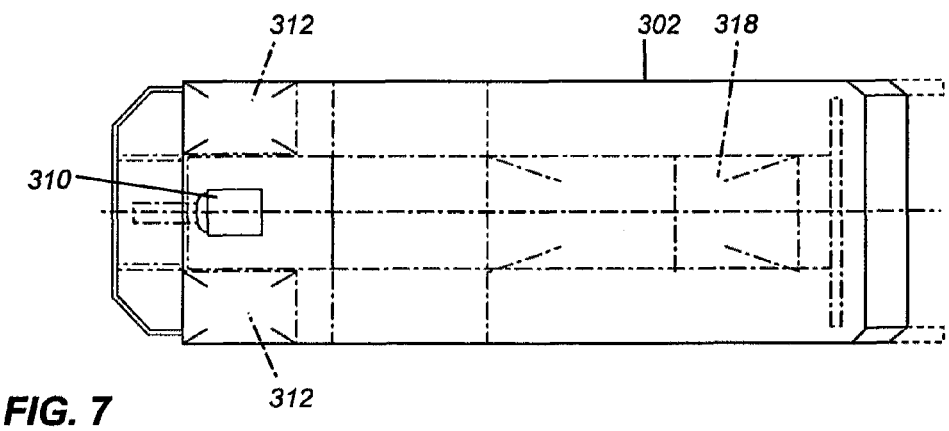
FIG. 7 is a plan of the hold of the barge of FIG. 5.

An example of such a barge is shown in the figures although it should be appreciated that the novel skimmer may be mounted to other types of vessels. As shown by way of example in FIG. 5 to FIG. 7, the barge 300 has a hull 302, a main deck 304, railings 306, a pilot house 308, an engine room with engine 310, fuel tanks 312, outboard propulsion system 314, a hydraulic power pack 316, a reclaiming tank 318 (also referred to herein as a containment tank, container or holding tank), a crane 320 for manipulating the skimmers and transfer pump, a pair of skimmers 100 disposed in this exemplary configuration at the front of the barge 300, and a control console 322 for controlling the skimmers. The hull, pilot house and decks of the barge may be constructed from bare (unpainted) marine grade aluminum (e.g. 5000 or 6000 series) for optimal performance in contaminated water environments, although persons of ordinary skill in the art will appreciate that other materials may be substituted or utilized.

In the embodiment depicted in the figures, the barge has two side-by-side skimmers. These skimmers may be controlled by a common controller or by two separate controllers. Each of the skimmers may be powered by a respective pair of hydraulic actuators. Although in the illustrated embodiments the barge has two skimmers, it will be appreciated that the barge may include more than two skimmers. In other words, the barge may have any number of parallel replaceable skimmers.

Applicant has discovered that merely widening the skimmer's contact surface counter-intuitively does not increase performance but actually degrades performance due to power requirements and conveyor distortion issues. Accordingly, the barge uses multiple parallel skimmers rather than a single wide skimmer. The skimmers may be replaceable modular units that can be removed for maintenance, overhaul, repair or servicing or replaced by an altogether new skimmer.

Figure 8:
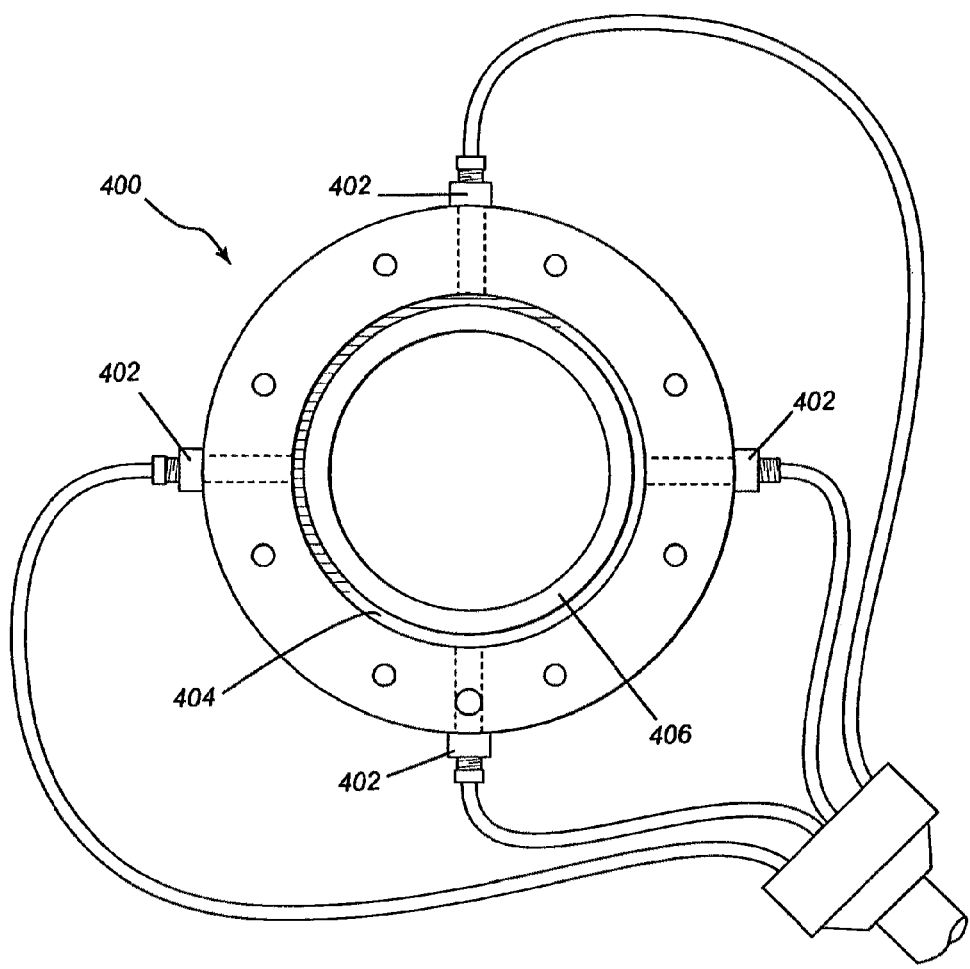
FIG. 8 is a front view of an annular fluid-injection flange for the transfer of bitumen.
Figure 9:
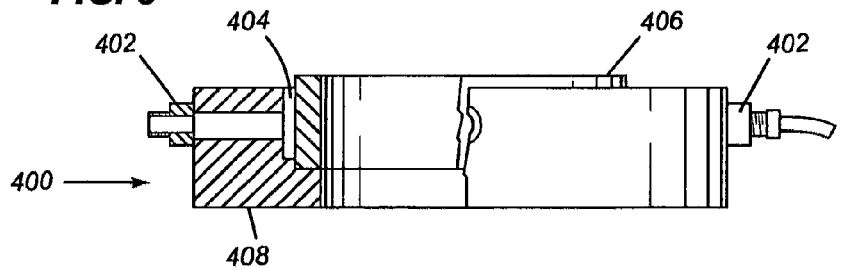
FIG. 9 is a cross-sectional view of the flange of FIG. 8.

In another main set of embodiments, the barge may include a bitumen transfer pump (not illustrated) for transferring bitumen from the barge to shore (or to another barge or vessel). This bitumen transfer pump may be disposed in the holding tank. The bitumen transfer pump, in one embodiment, has an Archimedean screw for displacing the bitumen and an annular fluid-injection flange 400, such as the one shown by way of example in FIG. 8 and FIG. 9. As shown in the figures, water or other lubricating fluid enters the annular fluid-injection flange 400 via a plurality of equidistantly-spaced inlets 402. The annular fluid-injection flange may be constructed of an inner ring 406 and an outer ring 408, as shown by way of example in FIG. 9. The water is redirected through an annular outlet 404 to form an annulus of water. The annular fluid-injection flange 400 thus enables an annulus of fluid, e.g. water, to be injected into the transfer line. The water (or other fluid) provides an annular water barrier around the discharging, extremely viscous bitumen. Previously, conventional techniques required that bitumen be mixed with a solvent such as naptha. Once the bitumen-naptha mixture reaches its downstream destination, the naptha is then removed from the bitumen, and recycled back upstream for reuse with the next amount of bitumen.

An example of a suitable bitumen transfer pump is the FOILEX TDS ("Twin Disc Screw") pump available from FOILEX Engineering AB (Göteborg, SWEDEN). The FOILEX TDS pumps are designed for off-loading or transfer pumping of highly viscous substances such as crude oil, bunker oil and emulsions. These pumps have been found by Applicant to work exceptionally well with bitumen as well provided the annular fluid-injection flange 400 is used to lubricate the discharge hose. It will be appreciated that other pumps may be substituted.

In the embodiment illustrated by way of example, the crane 320 may be a knuckle crane or equivalent. This crane is designed for moving the detachable (replaceable) skimmers and for moving the transfer pump into and out of the holding tank.

In the embodiment illustrated by way of example, the holding tank 318 (i.e. container, containment tank, reclaiming tank) may be, for example, approximately five cubic meters for holding skimmed bitumen or heavy oil, although it will be appreciated that the volume may be varied depending on the size of the barge or other factors. The transfer pump is placed in the bottom of the holding tank to transfer skimmed bitumen or heavy oil to shore or to another vessel via a discharge hose or other transfer means.

In one embodiment, the barge has an oil reservoir that is disposed at a bottom inside surface of the hull. This placement of the oil reservoir facilitates heat transfer to the hull and surrounding body of water, thereby cooling the hydraulic oil.

In one embodiment, the barge has one or more hydraulic outboard drives for propulsion. Each propeller 324 is tilt-adjustable and height-adjustable. The height-adjustable mechanism may optionally be limited so that the propeller can only be lowered as deep as the hull but no further to ensure that the propeller remains protected by the hull even at its lowest (deepest) position.

Optionally, the barge may include a hitch for towing an object, for example, for towing a boom, another barge, a smaller watercraft, a pontoon skimmer, etc.

Instead of mounting one or more skimmers to a barge, a single skimmer may be pontoon-mounted and controlled remotely by a cable or wireless link. The pontoon-mounted single skimmer may be operated by a user on shore or on a nearby barge or vessel. Optionally, two pontoon-mounted single skimmers may be attached to the starboard and port sides of the barge to increase the skimming capacity, e.g. to a total of four skimmers. These may be connected to the barge using a vertical keyway that allows vertical self-adjustment of the pontoon-mounted skimmers so that each one can operate at the optimal depth.

The skimmers may also be adapted for land-based operation. Due to the variability of the depth from the mounting point on shore, a series of skimmers may be installed to reach a desired elevation without the assistance of a pump.

Methods

The foregoing skimmer and barge technologies enable various new methods for skimming heavy oil or bitumen.

One method is a method of skimming heavy oil or bitumen using automatically controlled skimmers. In other words, this method entails automatically controlling the elevation (depth) of the skimmer using an elevation sensor (depth sensor) that sends a control signal to a controller that, in turn, controls the elevation (depth) of the skimmer. This method involves disposing the skimmer in the water. This may be accomplished by manually operating the hydraulic actuators to lower the skimmer into the water. Once the skimmer is in the water, the automatic elevation control system is activated. This automatic elevation control system continually adjusts the depth of the skimmer to provide optimal skimming performance.

Another method entails recovering bitumen from a bitumen tailings pond or any other contaminated water environment. The method involves skimming bitumen from the water (e.g. tailings pond), dumping the bitumen into a holding tank and then pumping the bitumen from the holding tank. In one embodiment, the pumping is accomplished using an annular fluid-injection flange which introduces an annulus of fluid such as water inside the discharge hose around the bitumen being pumped out (to lubricate the discharge hose).

These methods may be performed independently of one another or together. The method of transferring bitumen may be performed without heating the bitumen or, as noted above, mixing the bitumen with any solvent. These methods may be used to recover heavy oil and bitumen from tailings ponds or other bodies of water at any temperature above freezing.

The foregoing technologies are directed to recovery of bitumen or heavy oil. However, the technologies may also be used to recover some medium oils as well. For the purpose of this specification, it should be understood that the term "heavy oil" is meant to encompass petroleum or hydrocarbon substances having a downhole viscosity of 10 to 10,000 cPo (centipoises) whereas the term "bitumen" is meant to encompass oil sand or tar sand substances having a downhole viscosity of greater than approximately 10,000 cPo.

The embodiments of the invention described above are intended to be exemplary only. As will be appreciated by those of ordinary skill in the art, to whom this specification is addressed, many obvious variations can be made to the embodiments present herein without departing from the spirit and scope of the invention. The scope of the exclusive right sought by the applicant is therefore intended to be limited solely by the appended claims.

The invention claimed is:

1. A skimmer comprising:
a frame for supporting a drive sprocket and for supporting a drum;
a conveyor driven around the drum by the drive sprocket, the conveyor defining a downwardly moving upper flight and an upwardly moving lower flight;
a trough disposed below a portion of the lower flight, the trough extending from the drum to a discharge opening;
a pusher mechanism disposed at the discharge opening to force bitumen or heavy oil from the conveyor into the discharge opening;
a shear plate disposed at the discharge opening, wherein the shear plate has a knife-edge for cutting away bitumen or heavy oil adhering to the conveyor; and
an automatic elevation control system for generating a control signal when sensing an elevation of the conveyor and for automatically controlling the elevation of the skimmer based on the control signal by controlling hydraulic cylinders to cause wheels of the skimmer to roll over guide rails to raise or lower the skimmer.

2. The skimmer as claimed in claim 1 wherein the conveyor is an articulated open mesh defining cavities for collecting and transporting the heavy oil or bitumen and wherein the pusher mechanism is a press roller adapted to press the heavy oil or bitumen from the cavities.

3. The skimmer as claimed in claim 1 wherein the frame comprises four bearing-adjustment mechanisms for adjusting the relative position of the left and right bearings of the drive sprocket and the left and right bearings of the drum.

4. The skimmer as claimed in claim 1 further comprising a trough-tensioning mechanism having a plurality of spring assemblies connecting the frame to the trough for elastically holding the trough at a predetermined distance from the lower flight of the conveyor.

5. The skimmer as claimed in claim 1 further comprising a funnel and splash guard at least partially surrounding the drive sprocket for guiding heavy oil and bitumen into the holding tank.

6. The skimmer as claimed in claim 1 further comprising a lower shear plate disposed at the drum, wherein the lower shear plate has a knife-edge for cutting away bitumen or heavy oil adhering to the drum.

7. A skimmer comprising:
   a frame for supporting a drive sprocket and for supporting a drum;
   a conveyor driven around the drum by the drive sprocket, the conveyor defining a downwardly moving upper flight and an upwardly moving lower flight;
   a trough disposed below a portion of the lower flight;
   a pusher mechanism disposed at a discharge opening to force bitumen or heavy oil from the conveyor into the discharge opening;
   a shear plate disposed at the drum, wherein the shear plate has a knife-edge for cutting away bitumen or heavy oil adhering to the drum; and
   an automatic depth control system for controlling a depth of the skimmer by controlling hydraulic cylinders to cause wheels of the skimmer to roll over guide rails to raise or lower the skimmer.

8. The skimmer as claimed in claim 7 wherein the conveyor is an articulated open mesh defining cavities for collecting and transporting the heavy oil or bitumen and wherein the pusher mechanism is a press roller adapted to press the heavy oil or bitumen from the cavities.

9. The skimmer as claimed in claim 7 wherein the frame comprises four bearing-adjustment mechanisms for adjusting the relative position of the left and right bearings of the drive sprocket and the left and right bearings of the drum.

10. The skimmer as claimed in claim 7 further comprising a trough-tensioning mechanism having a plurality of spring assemblies connecting the frame to the trough for elastically holding the trough at a predetermined distance from the lower flight of the conveyor.

11. The skimmer as claimed in claim 7 further comprising a funnel and splash guard at least partially surrounding the drive sprocket for guiding heavy oil and bitumen into the holding tank.

12. The skimmer as claimed in claim 7 further comprising an upper shear plate disposed at the discharge opening, wherein the upper shear plate has a knife-edge for cutting away bitumen or heavy oil adhering to the conveyor.

13. A skimmer comprising:
   a frame for supporting a drive sprocket and for supporting a drum;
   a conveyor driven around the drum by the drive sprocket, the conveyor defining a downwardly moving upper flight and an upwardly moving lower flight;
   a trough disposed below a portion of the lower flight, the trough extending from the drum to a discharge opening;
   a pusher mechanism disposed at the discharge opening to force bitumen or heavy oil from the conveyor into the discharge opening; and
   an automatic elevation control system for generating a control signal when sensing an elevation of the conveyor and for automatically controlling the elevation of the skimmer based on the control signal by controlling hydraulic cylinders to cause wheels of the skimmer to roll over guide rails to raise or lower the skimmer.

14. The skimmer as claimed in claim 13 wherein the conveyor is an articulated open mesh defining cavities for collecting and transporting the heavy oil or bitumen and wherein the pusher mechanism is a press roller adapted to press the heavy oil or bitumen from the cavities.

15. The skimmer as claimed in claim 13 wherein the frame comprises four bearing-adjustment mechanisms for adjusting the relative position of the left and right bearings of the drive sprocket and the left and right bearings of the drum.

16. The skimmer as claimed in claim 13 further comprising a trough-tensioning mechanism having a plurality of spring assemblies connecting the frame to the trough for elastically holding the trough at a predetermined distance from the lower flight of the conveyor.

17. The skimmer as claimed in claim 13 further comprising a funnel and splash guard at least partially surrounding the drive sprocket for guiding heavy oil and bitumen into the holding tank.

18. The skimmer as claimed in claim 13 further comprising a lower shear plate disposed at the drum, wherein the lower shear plate has a knife-edge for cutting away bitumen or heavy oil adhering to the drum.

19. The skimmer as claimed in claim 18 further comprising an upper shear plate disposed at the discharge opening, wherein the upper shear plate has a knife-edge for cutting away bitumen or heavy oil adhering to the conveyor.

20. The skimmer as claimed in claim 13 further comprising an upper shear plate disposed at the discharge opening, wherein the upper shear plate has a knife-edge for cutting away bitumen or heavy oil adhering to the conveyor.

21. A method of skimming heavy oil or bitumen, the method comprising:
   disposing a skimmer having a conveyor in a water environment contaminated with heavy oil or bitumen;
   operating the conveyor of the skimmer to recover the heavy oil or bitumen from the water environment; and
   automatically controlling a depth of the skimmer using an automatic depth control system that receives a control signal from a depth sensor connected to the skimmer by controlling hydraulic cylinders to cause wheels of the skimmer to roll over guide rails to raise or lower the skimmer.

22. The method as claimed in claim 21 wherein operating the conveyor comprises:
   pushing heavy oil or bitumen from cavities of an articulated mesh forming the conveyor using a press roller disposed above a discharge opening; and
   cutting away heavy oil or bitumen adhering to the conveyor using a knife-edged shear plate disposed at the discharge opening.

23. The method as claimed in claim 22 wherein operating the conveyor further comprises cutting away heavy oil or bitumen adhering to a drum around which the conveyor travels by using a second knife-edged shear plate.

* * * * *